US008561996B2

(12) United States Patent
Picatto et al.

(10) Patent No.: US 8,561,996 B2
(45) Date of Patent: Oct. 22, 2013

(54) BEARING ASSEMBLY, PARTICULARLY FOR USE IN AGRICULTURAL APPLICATIONS

(75) Inventors: Fabio Picatto, Turin (IT); Davide Zanghi, San Germano Chisone (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/322,047

(22) PCT Filed: May 25, 2009

(86) PCT No.: PCT/EP2009/056293
§ 371 (c)(1),
(2), (4) Date: Feb. 6, 2012

(87) PCT Pub. No.: WO2010/136058
PCT Pub. Date: Dec. 2, 2010

(65) Prior Publication Data
US 2012/0126489 A1 May 24, 2012

(51) Int. Cl.
*F16J 15/32* (2006.01)
(52) U.S. Cl.
USPC .......................... 277/353; 277/551; 277/562
(58) Field of Classification Search
USPC .......................... 277/353, 551, 562
See application file for complete search history.

(56) References Cited

U.S. PATENT DOCUMENTS

| 4,249,782 | A | 2/1981 | Frank | |
|---|---|---|---|---|
| 6,719,459 | B1 | 4/2004 | Gotoh | |
| 7,258,491 | B2 | 8/2007 | Gutowski | |
| 2005/0089254 | A1* | 4/2005 | Takehara et al. | 384/484 |
| 2008/0073856 | A1* | 3/2008 | Munekata | 277/559 |
| 2009/0154864 | A1* | 6/2009 | Komori et al. | 384/589 |
| 2010/0232734 | A1* | 9/2010 | Torii et al. | 384/481 |

FOREIGN PATENT DOCUMENTS

| CN | 1594902 A | 3/2005 |
|---|---|---|
| CN | 2844553 Y | 12/2006 |
| WO | WO2008047507 A | 4/2008 |

* cited by examiner

*Primary Examiner* — Vishal Patel
*Assistant Examiner* — Stacy Warren
(74) *Attorney, Agent, or Firm* — Bryan Peckjian; SKF USA Patent Group

(57) ABSTRACT

The bearing seal assembly (50) includes a metal shield (70) and a resilient multi-lip sealing gasket (60) secured to the metal shield. The metal shield is supported in use by an outer ring (20) of a rolling contact bearing and includes a diagonally extending central portion (72). The sealing gasket (60) provides a number of contacting lips (62-64) facing an inner ring of the rolling contact bearing. A first, main contacting lip (66) exerts a first radial load on the inner ring. A second contacting lip (62) extends from the first lip (66) and exerts a second radial load on the inner ring lower than the first radial load. A third contacting lip (64) is on the opposite side of the second lip (62) with respect to the first lip (66) and exerts a third radial load on the inner ring lower than the first radial load but greater than the second radial load.

9 Claims, 1 Drawing Sheet

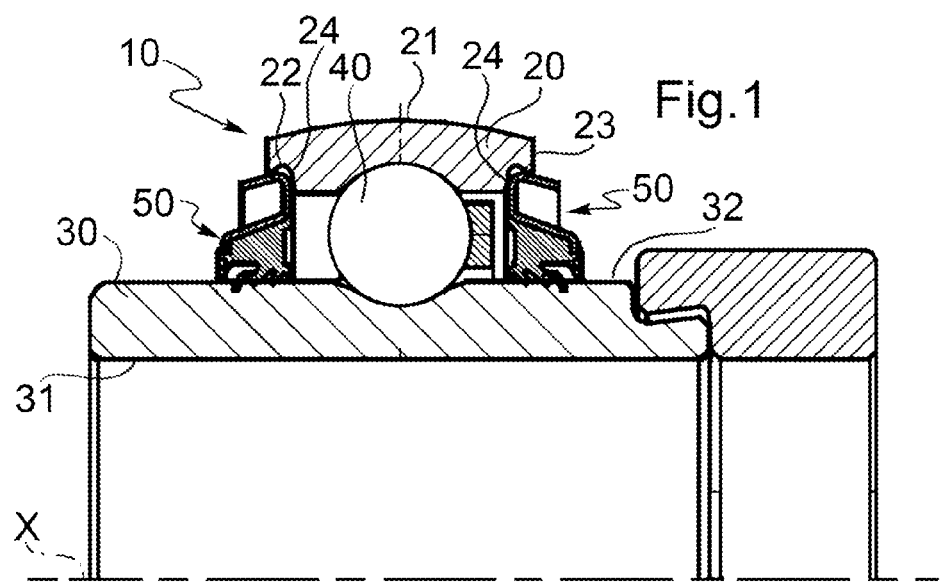
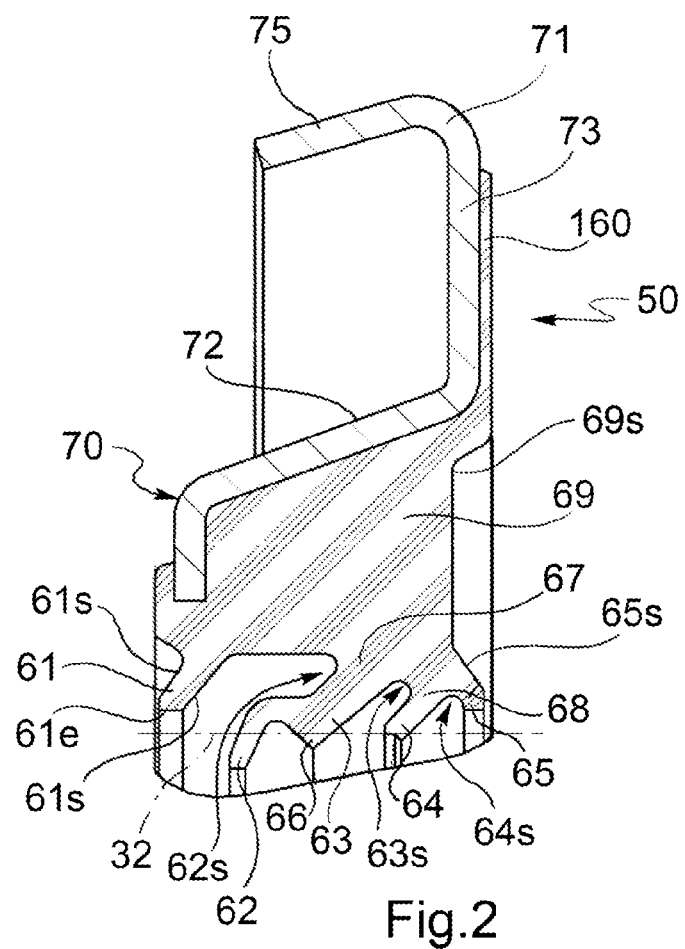

BEARING ASSEMBLY, PARTICULARLY FOR USE IN AGRICULTURAL APPLICATIONS

CROSS-REFERENCE

This application is the US national stage of International Application No. PCT/EP2009/056293 filed on May 25, 2009.

TECHNICAL FIELD

The present invention relates to a bearing seal assembly, particularly for use in agricultural applications. More particularly, the present invention relates to a bearing seal assembly suitable to be assembled with bearing units which enable moderate errors of alignment to be compensated for.

RELATED ART

U.S. Pat. No. 7,258,491 discloses a bearing seal assembly for harsh environmental conditions such as agricultural tillage applications, having a multi-lip seal and an associated lip seal to provide a primary and a secondary sealing barrier respectively. The primary sealing barrier is supported by the outer ring and includes:

a sheet metal shroud extending between an inner circumference of the outer ring and an outer circumference of the inner ring and having a diagonally extending central portion; and a multi-lip seal which is supported by the inwardly directed face of the diagonally extending portion of the metal shroud.

The secondary sealing barrier is supported by the inner ring and includes:

a slinger which is connected to the inner ring for rotation with the inner ring outwardly adjacent the seal shroud; and a lip seal located between the seal shroud and the slinger.

The slinger abuts a stepped portion of the inner ring, and the shroud includes an end portion projecting closely adjacent the stepped portion to provide a tortuous path between the slinger and the multi-lip seal.

The bearing seal assembly which is disclosed in the above identified document suffers from the following drawbacks:
1) the multi-lip seal which is defined by three squat and tough lips is sensitive to the eccentricity causing high friction against the inner rotating ring and this high friction causes early wear of the lips and involves a considerable waste of energy;
2) whenever the shroud comes out of alignment, the three squat and tough lips will not provide the same sealing action;
3) despite the two sealing barriers, the whole sealing action does not perform properly as the slinger and shroud could change their positions due to the possible misalignments of their supports.

SUMMARY

It is a general object of the present invention to provide a bearing seal assembly, particularly for use in agricultural applications, capable of overcoming one or more of the above prior art drawbacks. Particularly, it is a significant object of the invention to enhance the seal's effectiveness without increasing friction for any kind of bearing arrangements requiring a high degree of reliability, even under extremely contaminated conditions and further with some misalignment between the bearing rings.

These and other objects are achieved by a bearing seal assembly as defined in appended claim 1. Advantageous embodiments of the invention are defined in the dependent claims.

BRIEF DESCRIPTION OF THE DRAWINGS

In order that the present invention may be well understood, there will now be described a preferred embodiment thereof, given by way of example, reference being made to the accompanying drawings, in which:

FIG. 1 illustrates, in an axial cross sectional view, a preferred embodiment of a bearing seal assembly, particularly for use in agricultural applications, according to the present invention, and FIG. 2 is an enlarged view of the bearing seal assembly FIG. 1.

DETAILED DESCRIPTION OF THE INVENTION

With reference to FIGS. 1 and 2, numeral 50 designates, as a whole, a bearing seal assembly which is suitable for being installed on either side of a bearing unit 10. The bearing unit 10 is adapted for receiving a shaft (not shown) for rotation about an axis x, and includes an outer ring 20, an inner ring 30 axially extended on both sides, and a single row of balls 40. The outer ring 20 has two inner circumferential grooves 22 adjacent to both sides of the balls 40 and an outermost convex spherical surface 21 which accommodates moderate misalignment but without permitting axial displacement. Each circumferential groove 22 is laterally bounded towards the balls 40 by a respective annular surface 24 which is perpendicular to the axis x and is arranged axially inwardly with respect to a relevant outwardly facing wall 23 of the outer ring 30.

The inner ring 30 is rotatable with respect to the outer ring 20. Inner ring 30 provides an outer cylindrical surface 32 faced toward the outer ring 20 and an inner cylindrical cavity 31 in which the shaft is to be secured for rotation about the axis x.

The bearing seal assemblies 50 are fitted at the axially outer ends of the outer ring 20, thereby sealingly bridging the annular space between the inner ring 30 and outer ring 20, in order to prevent contaminants from entering the bearing unit 10 while keeping the lubricating grease within it.

As better shown in FIG. 2, each assembly 50 includes an annular sheet metal stiffening insert 70 and a multi-lip resilient annular gasket 60 of elastomeric or rubber-like material (preferably made from acrylonitrile-butadiene rubber) which is coupled by vulcanization with the insert 70. The insert 70 comprises:

an outer edge 71 which is suitable for being crimped into the relevant groove 22 to anchor the assembly 50 in its working position, a disc annular portion 73 which extends radially inwardly from the edge 71 and is perpendicular to the axis x in order to abut the relevant annular surface 24, and an axially angled or conical portion 75 which is linked to the disc annular portion 73 by the edge 71.

The insert 70 further comprises another axially angled or conical portion 72 which is parallel to the portion 75 and linked to the disc annular portion 73 at the radially inner circumference of the disc-annular portion 73).

The metal insert 70 serves also as a barrier against solid contaminants and since the outer edge 71 is crimped into the relevant groove 22, such a plastic deformation provides a steady mounting of the assembly 50 onto the bearing unit 10.

Furthermore, due to the fact that the outer edge 71 is plastically deformed and the disc annular portion 73 abuts against the relevant surface 24, these two portions define a rigid support for the angled portion 72 which in turn defines an elastic support for the gasket 60 so as to allow the gasket 60 to be always kept in contact with the surface 32, as better explained herein after.

In the preferred embodiment of the invention the multi-lip sealing gasket 60 is vulcanized to the insert 70 and comprises:

a main body 69 which is in direct contact with the angled portion 72 and five lips 61-65 which extend generally radially inwardly from the main body 69. Of these five lips, the lips 61 and 65 are non-contacting lips as they are radially spaced apart from the surface 32 and are located at the opposite axial ends of the main body 69 so as to protect and axially contain the lips 62-64 between them. The lips 62-64 are intermediate contacting lips and are arranged to slide against the outer cylindrical surface 32 (shown in phantom in FIG. 2) of the inner ring. It should be noted that in the appended drawings the resilient sealing gasket 60 is depicted in its non-deformed condition.

The non contacting lip 61 is an axially outermost lip and defines a labyrinth seal to prevent inwardly acting coarse contaminants from damaging the inner lips 62-64. The lip 61 is a conical lip axially delimited by two conical, axially outwardly and radially inwardly tapering surfaces 61$s$. The lip 61 is also provided with a free end 61$e$ which terminates closely adjacent the surface 32 without contacting it.

The non-contacting lip 65 is the axially innermost lip and projects closely adjacent the surface 32 and acts as a grease retainer for keeping, although only partially, the lubricating grease within the bearing unit 10. The lip 65 defines another labyrinth seal and it is inwardly axially delimited by a conical tapering surface 65$s$ which is joined to an axially recessed, radial flat surface 69$s$ of the main body 69 in order to facilitate the recirculation of the grease within the bearing unit 10.

The lip 64 is adjacent to the lip 65 and shares with the lip 65 a common root portion 68 originating for the main body 69. The lip 64 is shaped as a conical wall. It is longer and more flexible than lip 65, and extends substantially parallel to the lip 61 from the root portion 68 and in an axially opposite direction with respect to the lip 65. The lip 64 defines with the lip 65 an intermediate annular cave 64$s$ which is able to receive some lubricating grease which may leak from the lip 65.

The lip 63, which extends substantially parallel and adjacent to the lip 64, is shaped as a conical wall and has a thickness which is almost twice that of the lip 64. The lip 63 is provided with a root portion 67 located approximately in the middle of the main body 69 and originates from an axially inner position with respect to the root portion 68. Opposite to the root portion 67, the lip 63 is provided with a sturdy contacting lip 66 with a tip about 90 degrees wide and which defines with the lip 63 and the lip 64 a further cave 63$s$. The diameter at the bottom of cave 63$s$ is greater than the bottom diameter of cave 64$s$. The cave 63$s$ extends into the main body 69 so as to partially split the two root portions 68 and 67. Besides being pre-greased with specific lubricating grease, the cave 63$s$ is also able to receive some of the lubricating grease which may leak passing over lip 64. This will help to further reduce the wear of the lip 66.

The lip 62 is the only contacting lip which does not originates for the main body 69 as it originates directly from the lip 63 and it is provided with a root portion 62$r$ extending from the lip 63 nearby the lip 66. Also lip 62 is shaped as a conical wall, but it is the longest and most flexible among the lips above mentioned.

The lip 66, the lip 62 and the main body 69 define a further cave 66$s$ which is outwardly radially delimited by a bottom cylindrical surface 62$s$ whose diameter is greater than the diameter at the bottom of cave 63$s$.

Due to the above construction and arrangement, the lip 63 acts as the main sealing lip and is able to exert the greatest value of radial pressure against the surface 32, whereas the second lip 64 is able to exert a medium value of radial pressure and lower than that of the value of the radial pressure of lip 63. Finally, the lip 62 will be able to exert a lower radial pressure as compared to the other two contacting lips 64 and 63, and is able to act as an anti-dust lip to protect the main lip 63.

Whilst it is not desired to be bound to any specific theory in this connection, tests carried out by the Applicant show that, as a result of the above arrangement, the lip 63 acts as a pivot or fulcrum when some misalignment takes place between the shaft and the stationary parts of the bearing. As a result, the contact radial pressure exerted by the lip 62 will increase, whereas the radial pressure of the lip 64 will decrease or vice versa, depending on the direction of the relative inclination between the inner and outer bearing rings. However, in the worst misalignment conditions, at least one of the lips 62, 64, on opposite sides of the lip 66, will remain in sliding contact with the inner ring 30 together with the main lip 66, but without increasing the overall pressure, owing to their thin, elongate and flexible construction. Therefore, the sealing assembly 50 assures that at least two sliding lips are permanently in sliding contact with the inner ring, like a dual barrier stopping contaminants from entering the bearing.

Finally, in order to increase the overall sealing performances of the above described assembly 50, the sealing gasket 60 further comprises a static seal 160 in form of a layer which is made of the same material of the main body 69 and which covers almost completely the side of the annular portion 73 which abuts the surface 24.

While a specific embodiment of the invention has been disclosed, it is to be understood that such disclosure has been merely for the purpose of illustration and that the invention is not to be limited in any manner thereby. Various modifications will be apparent to those skilled in the art in view of the foregoing example. The scope of the invention is to be limited only by the appended claims.

The invention claimed is:

1. A bearing seal assembly, particularly for use in agricultural applications, including:
   a metal shield which is supported in use by an outer ring of a rolling contact bearing and includes a diagonally extending central portion (72); and
   a resilient multi-lip sealing gasket secured to the metal shield and being provided with a plurality of sealing and contacting lips facing an inner ring of the rolling contact bearing; and wherein
the multi-lip sealing gasket comprises:
   a first contacting lip which exerts a first radial load on the inner ring, wherein the first contacting lip extends radially inward a first distance;
   a second contacting lip which extends from the first lip and which exerts a second radial load on the inner ring lower than the first radial load, wherein the second contacting lip extends radially inward a second distance which is greater than the first distance; and
   a third contacting lip which is on the opposite side of the second lip with respect to the first lip and which exerts a third radial load on the inner ring lower than the first radial load but greater than the second radial load, wherein the third contacting lip extends radially inward a third distance which is less than the first and second distances.

2. The bearing seal assembly as claimed in claim 1, further comprising a first non-contacting lip for holding lubricant within the rolling contact bearing, and a second non-contacting lip for preventing contaminants from entering the rolling contact bearing.

3. The bearing seal assembly as claimed in claim 2, wherein the first contacting lip is an axially intermediate lip; and wherein
the first contacting lip is the thickest and least flexible lip among the first, the second and the third contacting lips, and wherein the second and the third contacting lips, located on opposite sides of the first contacting lip are more flexible, elongate lips, which extend substantially parallel to a conical, axially outwardly and radially inwardly tapering surface, and each exert a lower radial pressure against the inner ring as compared to the first lip.

4. The bearing seal assembly according to claim 1, wherein the first lip and the second lip located axially outwardly of the first lip originate from a common conical thicker lip which extends in an axially outward and radially inward direction.

5. The bearing seal assembly according to claim 4, wherein the common, thicker lip has a root portion substantially disposed in the middle of the gasket.

6. The bearing seal assembly according to claim 5, wherein the third lip located axially inwardly of the first lip has a root portion originating from a radially inner position with respect to the root portion of the thicker common lip.

7. The bearing seal assembly according to claim 1, wherein the third lip is stiffer than the second lip.

8. The bearing seal assembly according to claim 1, further including an axially outermost non-contacting conical lip which extends parallel to the second and third contacting lips and terminates in use closely adjacent the cylindrical surface of the inner ring.

9. The bearing seal assembly according to claim 1, further including an axially innermost non-contacting lip which terminates in use closely adjacent the cylindrical surface of the inner ring.

* * * * *